United States Patent
Nayak et al.

(10) Patent No.: US 8,930,863 B2
(45) Date of Patent: Jan. 6, 2015

(54) SYSTEM AND METHOD FOR ALTERING CIRCUIT DESIGN HIERARCHY TO OPTIMIZE ROUTING AND POWER DISTRIBUTION USING INITIAL RTL-LEVEL CIRCUIT DESCRIPTION NETLIST

(71) Applicant: Atrenta, Inc., San Jose, CA (US)

(72) Inventors: Anshuman Nayak, San Jose, CA (US); Samantak Chakrabarti, Kolkata (IN); Brijesh Agrawal, Greater Noida (IN); Nilam Sachan, Noida (IN)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/829,211

(22) Filed: Mar. 14, 2013

(65) Prior Publication Data
US 2014/0282338 A1   Sep. 18, 2014

(51) Int. Cl.
G06F 17/50  (2006.01)
(52) U.S. Cl.
CPC ................................. G06F 17/5081 (2013.01)
USPC ......................................... 716/104; 716/126
(58) Field of Classification Search
CPC ................................ G06F 17/50; G06F 9/455
USPC .................................................. 716/104, 126
See application file for complete search history.

(56) References Cited

U.S. PATENT DOCUMENTS

| | | | |
|---|---|---|---|
| 6,536,028 B1 | 3/2003 | Katsioulas et al. | |
| 6,711,729 B1 | 3/2004 | McElvain et al. | |
| 6,718,520 B1 | 4/2004 | Merryman et al. | |
| 7,039,881 B2 | 5/2006 | Regan | |
| 7,418,686 B1 * | 8/2008 | Knol et al. | 716/118 |
| 8,266,571 B2 | 9/2012 | Chapman et al. | |
| 2002/0157063 A1 | 10/2002 | Besson | |
| 2003/0101331 A1 | 5/2003 | Boylan et al. | |

OTHER PUBLICATIONS

Wongjong Kim et al., "Hierarchy Restructuring for Hierarchical LVS Comparison", Dept. of Electronics Eng., Hanyang University, Anson, Kyungki 425-791, S. Korea, VLSI Design, 1999, vol. 10, No. 1, pp. 117-125.

* cited by examiner

Primary Examiner — Thuan Do
(74) Attorney, Agent, or Firm — Thomas Schneck; Mark Protsik

(57) ABSTRACT

Systems and methods are disclosed for modifying the hierarchy of a System-on-Chip and other circuit designs to provide better routing and performance as well as more effective power distribution. A user specifies desired modifications to the design hierarchy and then the system automatically alters the hierarchy by performing group, ungroup, and move operations to efficiently and optimally implement the desired hierarchy modifications. Any modifications to port and signal names are automatically resolved by the system and the resultant RTL matches the function of the input RTL. The user then evaluates the revised hierarchy with regard to power distribution and routing congestion, and further hierarchy modifications are performed if necessary. A widget user interface facility is included to allow user-guided direction of hierarchy modifications in an iterative fashion.

22 Claims, 7 Drawing Sheets

600
Floating Ports
Figure 6a
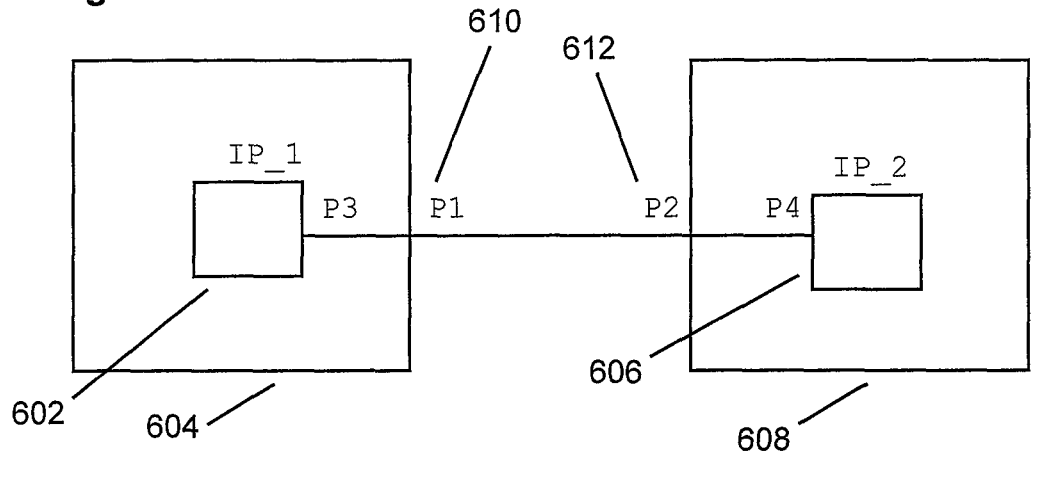
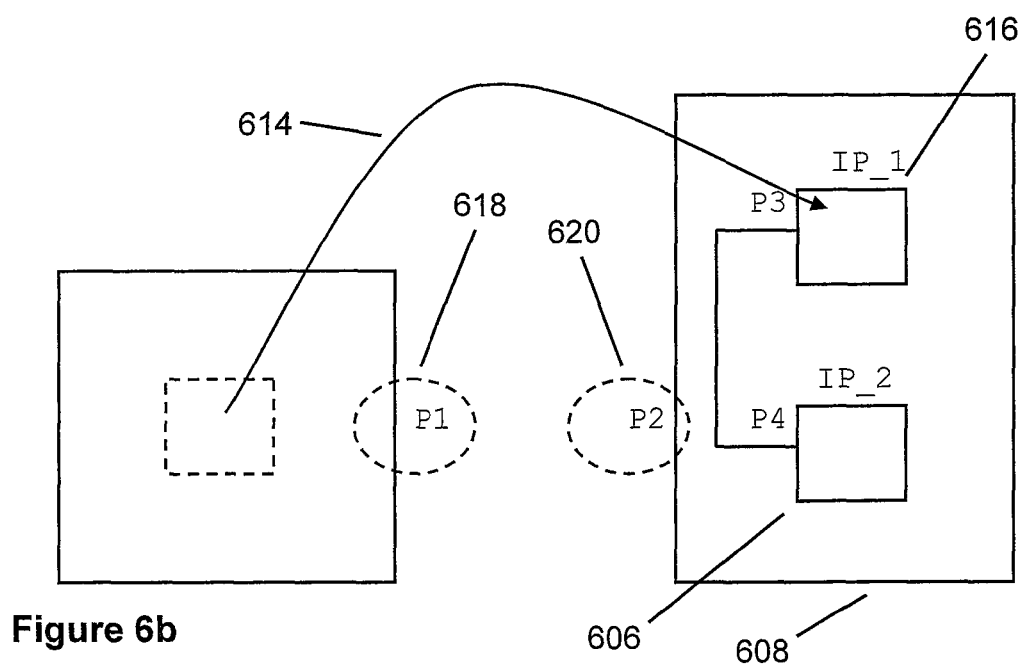
Figure 6b
Figure 6

SYSTEM AND METHOD FOR ALTERING CIRCUIT DESIGN HIERARCHY TO OPTIMIZE ROUTING AND POWER DISTRIBUTION USING INITIAL RTL-LEVEL CIRCUIT DESCRIPTION NETLIST

TECHNICAL FIELD

The present invention relates generally to Electronic Design Automation (EDA), and in particular to the processing of netlists of System-on-Chip (SOC) designs and to the modification of hierarchy structures in SOC designs.

BACKGROUND ART

Historically, the semiconductor industry has relied on personal computer (PC) sales to drive growth. However in the recent past, semiconductors have found a home in the world of consumer electronics, where embracing newer technologies has become a fashion statement. As a result, consumer electronics products have a short shelf life and time-to-market is a key factor in the success of products. Another consequence of the surge in consumer electronics is the demand for more integrated semiconductor technologies with smaller geometries as well as need for better battery life. These trends bring in a need for advanced design techniques where designers often source IP (Intellectual Property) blocks consisting of RTL (Register Transfer Level) design descriptions from various third party vendors and also reuse IP blocks across various SOCs. Often the SOC architect is not aware of the internals of an IP block functionality.

System-On-Chip (SOC) designs are large and complex, frequently reaching sizes in excess of 50 million gates. As a result, when a new or enhanced application is to be addressed by a new design, the new design is most often a modification of a previous SOC design. Typically, an engineering organization attempts to use as much of the previous design as possible in order to save time, resources, and expense, however last minute modifications are often made—some including the addition of IP blocks—with the result that power distribution is compromised and/or some nets are lengthened due to placement and congestion issues thereby compromising performance. In some cases, signal congestion will actually prevent a design from successfully routing. Some of these negative effects are due to the existing hierarchy structure which drives both placement and power distribution.

In the case where routing congestion makes nets too slow, or in some cases prevents successful routing altogether, it then becomes essential to dissolve the hierarchy of some of these IP blocks and merge portions of them with other logic for better routing. Given that designers will not be aware of the logic in most third party supplied IP blocks, a manual restructuring of IP blocks is quite error prone and lengthy. Also, with a focus towards low power design for better battery life, it is important to place various IP blocks and logic into different voltage and power domains based on the active functionality of a handheld device. These multiple voltage domains require designers to again restructure the design hierarchy and group functional design elements so that logic within the same voltage domain are preferably within the same hierarchy. This is also a manual step today and is quite error prone.

Therefore, it would be useful to have an automated way to restructure the hierarchy of an SOC design in order to move design elements with the same supply voltage closer together and/or move functions to reduce congestion for better routing and/or shorten the length of timing-critical nets.

SUMMARY DISCLOSURE

A computerized method and a system of one or more processors to implement the method is provided for automatically modifying the hierarchy structure of an RTL-level netlist as directed by a user's indication of what circuit elements and IP blocks should be moved to alternate locations—or cloned and placed in alternate locations—in the hierarchy. Functional equivalence is maintained between the input RTL and the resultant RTL by the system's revising the connectivity of repositioned circuit elements, including the creation or revision of ports between IP blocks. The method and system allow a user to indicate at a higher level one or more movement, group or ungroup definitions within a hierarchy model created from a netlist, and the system then automatically performs the lower level repositioning of circuit elements and revising of connectivity to preserve the desired functional equivalence. The modified netlist is saved in a database of circuit description netlists. Alternative netlists may likewise be created and then evaluated to determine which one produces the better level of performance and avoids any power distribution or signal congestion issues.

BRIEF DESCRIPTION OF THE DRAWINGS

FIG. 6 shows an example for moving of a design element from one IP block to another according to the invention, including the automatic deletion if floating ports created by the move.

DETAILED DESCRIPTION

Figure 1:
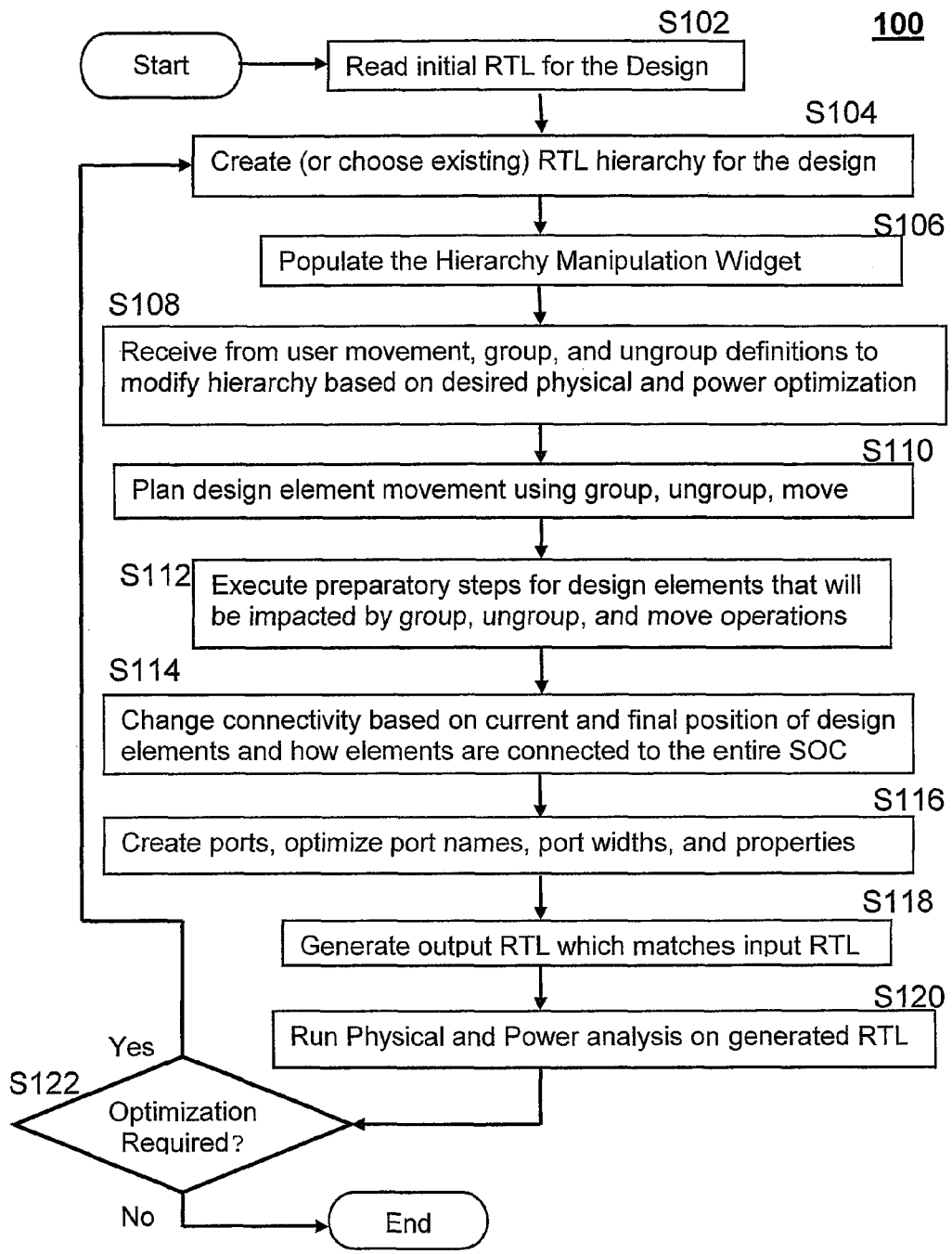
FIG. 1 shows a flow chart for the overall process of hierarchy modification according to an exemplary and non-limiting embodiment of the invention.

Systems and methods are disclosed for modifying the hierarchy of an SOC (System On Chip) design to provide better routing and performance as well as more effective power distribution. Hierarchy changes are easily and effectively evaluated early in the design process on a "what if" basis, or alternately made late in the cycle after last minute design modifications. A user specifies modifications to the design hierarchy and then the hierarchy is altered automatically by performing group, ungroup, and move operations to efficiently and optimally implement the desired hierarchy modifications. The user then evaluates the revised hierarchy with regard to power distribution and routing congestion, and further hierarchy modifications are performed if necessary. A widget user interface facility is included to allow user-guided direction of hierarchy modifications in an iterative fashion. Modifications to port and signal names are automatically resolved and the resultant RTL matches the function of the input RTL.

In design automation systems used for SOC design, the process of physical placement of design elements during the layout process is typically guided by the hierarchy of a design. Thus, a hierarchy that is not optimum may cause design elements to be physically placed in such a way that some nets suffer performance degradation and/or some design elements are placed poorly with respect to an optimum power distribution for the chip.

Note that throughout this specification reference will frequently be made to "IP blocks". Here "IP" refers to "Intellectual Property" however in the context of SoC design, IP block specifically refers to a functional circuit or macro circuit that may be connected to other such functional circuits as the overall SoC design is built. These IP blocks are often purchased or licensed from other companies and therefore may contain some degree of IP. Many SoC designers refer to such IP blocks or macros as simply "IPs". The specification and claims also refer to "design elements". A "design element" includes any functional element of a circuit design, and may include an IP block of any size, or a single element as small as a NAND gate or inverter.

An interface is defined as a collection of logical names and their characteristics or properties which are best defined together. Characteristics include signal attributes sometimes referred to as signal properties. It is possible to create a rule-based analysis and grouping process, and that will successfully group some of the signals in a netlist. However, most SOC designs comprise a wide variety of IP blocks or macros that frequently were supplied by diverse sources, and in different time periods. As such, the port names (signal names) and properties on some IP blocks may bear no resemblance to the port names and properties on other IP blocks to which they are connected.

IP Block Interface Definitions—Signal Names and Properties

In general, a standard or preexisting interface definition may include for each logical port one or more of the following attributes/properties which represent a non-limiting, exemplary list: LogicalPortName; Direction; MSB; LSB; sig_type; default; registered; optional; and requiresDriver. The attributes/properties listed above are defined as follows:
LogicalPortName—the signal name at a port on an IP block instance;
Direction—signal direction: input; output; or bidirectional;
MSB—Most Significant Bit of a bus;
LSB—Least Significant Bit of a bus;
sig_type—signal type as in clk, data, etc.;
default—a signal with a default characteristic that may be changed by a user;
registered—the output of a flip-flop, latch, or register;
optional—a signal that is optionally included at the discretion of the user;
requiresDriver—a signal that must be driven such as a clk pin or clk enable.

An exemplary and non-limiting embodiment for the overall flow for the invention is shown in the flowchart 100 of FIG. 1. In step S102 the system and software according to the invention reads initial RTL description(s) for an SoC design. In step S104 a user chooses an existing design hierarchy model as a starting point, or directs that a new model should be created from an RTL description. In step S106, the data structures for the Hierarchy Manipulation Widget are populated. In step S108 the system receives from a user various movement, group, and ungroup definitions directed to modify the hierarchy based on desired physical and power optimization criteria. In step S110, the system automatically plans design element movement using any combination of group, ungroup, and move operations, and plans these in such a way that the number of such operations required to fulfill the user's modification requests are minimized. In step S112, the system executes preparatory steps for design elements that will be impacted by group, ungroup, and move operations such that only the effected design elements are operated on, thus improving performance for large designs. In step S114, the design hierarchy is modified including changing connectivity based on the current and final position of design elements and how the elements are connected within the entire SOC. In step S116, ports are created as required and as guided by a user, and port names, port widths, and port properties are optimized automatically and as guided by user controls provided to the software widget. In step S118, an output RTL is generated that matches the input RTL. In step S120, a user may optionally run a physical and/or power analysis of the design represented by the output RTL in order to determine per S122 if further optimization of the design is required. At this point, if further optimization is required, the process repeats at step 104 where the user may choose any RTL version as a starting point. Should the user have chosen to perform multiple "what if" scenarios with different hierarchy modification strategies, at step S104 they may choose one of multiple existing RTL versions previously created to move forward toward choosing one final RTL to implement as a physical design.

UI and Widget for Hierarchy Manipulation

Figure 2:
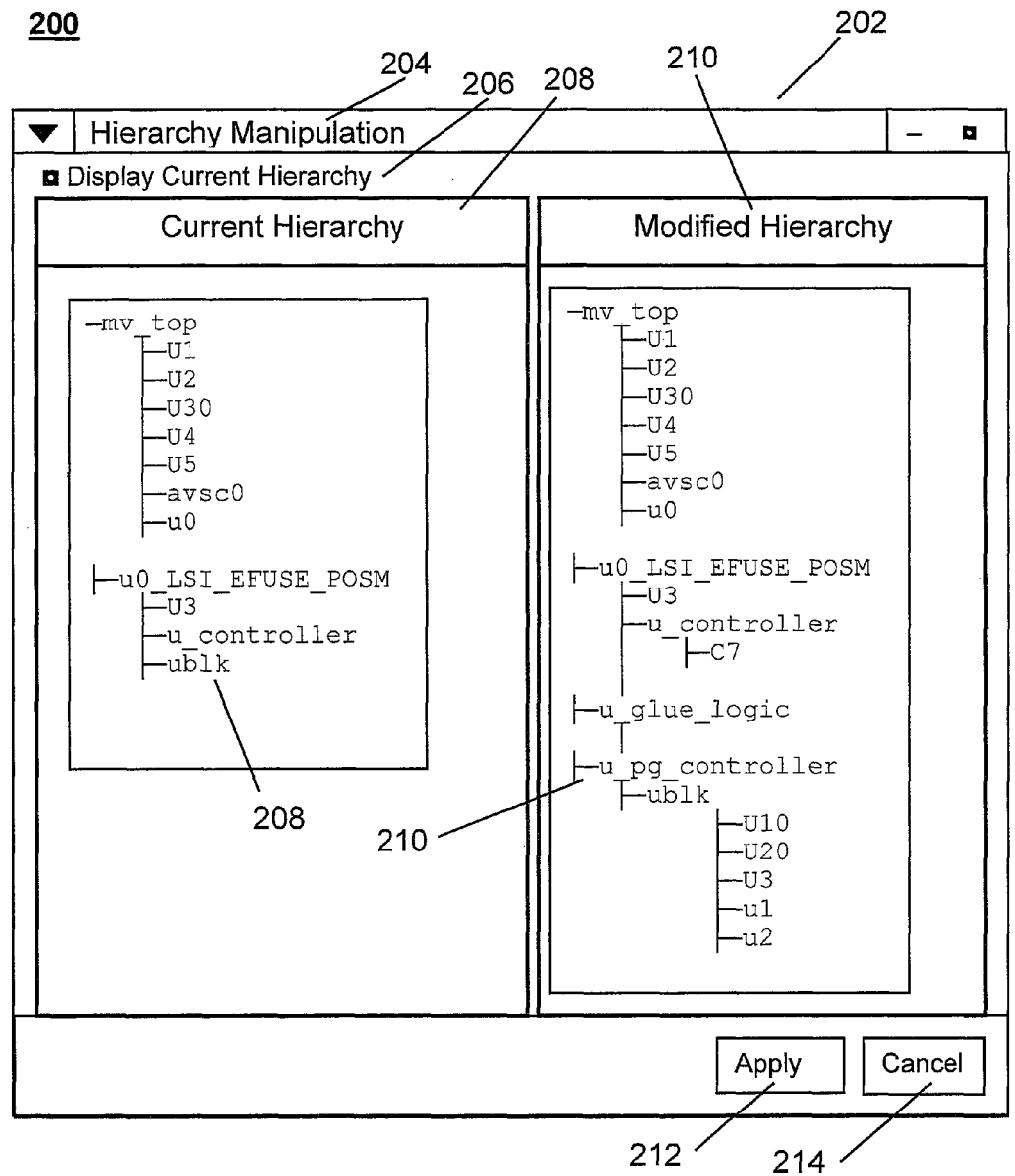
FIG. 2 shows an example of a user interface widget for hierarchy manipulation according to the invention.

An exemplary and non-limiting embodiment 200 for a user interface 202 for a Hierarchy Manipulation 204 invention is shown in FIG. 2. Here, as one embodiment of a UI for a "widget", two major windows display the current design hierarchy 208 and a modified design hierarchy 210. A user may optionally choose to show only the modified hierarchy by un-checking the "Display Current Hierarchy" check box 206.

Given a set of RTL files and a spec of which IP block or other design element a designer/user wants to move, group, or ungroup, the hierarchy manipulation widget provides a user interface for guided inputs to the widget software according to the invention that automatically determines the RTL subsystems which will not be impacted because of a specific hierarchy restructuring process. The advantage of this is that in populating data structures, the widget will bring in only the relevant hierarchies into the tool. This improves the runtime and memory consumed by this process.

The widget will also show the actual RTL hierarchy to a user and allow the user to change the RTL hierarchy by moving design elements around in a very interactive manner, as well as specifying specific grouping and ungrouping instructions. Having only the necessary portion of the design database populating the widget data structures, enables traversing the RTL files quickly. The RTL hierarchy is then quickly extracted and presented to the user so that the user can quickly and easily modify it. As part of the modification process, the widget allows the user to create new sub-systems, to dissolve existing sub-systems or to move some logic from one sub-system to the other. Further, if some design element is multiply instantiated and a user wants to move, group, or ungroup only a particular instance, then that user can perform design uniquification where a unique copy of the design element instance is created for this purpose.

Once the user has specified some number of move, group, or ungroup operations, typically based on physical constraints or reasons related to power distribution, the user then clicks on the Apply button 212 in the widget user interface to do the actual movement of logic. Alternately the user may cancel 214 the specified modifications whose results are shown in the new hierarchy window 210. After the Apply button 212 is pressed, the widget will then attempt to automatically optimize the number of hierarchy modifications very carefully so that an optimal set of movements are done. For example if a user specifies to move an IP block X from sub-system A to sub-system B, and then again to sub-system C, the widget will actually move it directly to sub-system C. Further, if a sub-system A has 3 IP blocks (x, y, z) and a user specifies to move 2 IP blocks (x and y), then a better solution might be to dissolve the sub-system and then create a new hierarchy around z rather than move the x and y IP blocks individually.

Methods for Hierarchy Manipulation

The invention discloses two exemplary and non-limiting methods for hierarchy manipulation, consistent with two types of use-models. In the first use-model, the logic to be restructured is not known initially, but is known late in the design cycle based on physical congestion analysis and power analysis. For such a use model, software according to the invention reads in the RTL and creates a RTL connectivity model. The user then uses the widget discussed with reference to FIG. 2 to move, group, or ungroup logic and software then alters the hierarchy and changes the internal connectivity model. A newer version of RTL after restructuring is created from this internal connectivity model. The key advantage of this flow is that the user can visualize the RTL connectivity model and the invention then creates a connectivity model that semantically matches the RTL.

In another use model, users will do some upfront what-if analysis at the very beginning of a design cycle where given an initial RTL database, users will try out various methods of restructuring and create several snapshots of RTL with different kinds of hierarchy restructuring from the same input RTL. Such a use model enables a "what-if" environment early in the design process.

For each of the above two use-models, software according to the invention provides at least three kinds of hierarchy manipulation operations. The Hierarchy Manipulation widget takes in the existing RTL hierarchy and the desired hierarchy after restructuring and then generates and executes an optimal set of restructure commands using at least group, ungroup, and move-instance operations.

Grouping:

In this method of hierarchy modification, some of the design elements in the same level of hierarchy are grouped together within a new hierarchy. Software according to the invention will manage the connectivity automatically and create additional ports on the new hierarchy so that the RTL is semantically correct.

Figure 3:
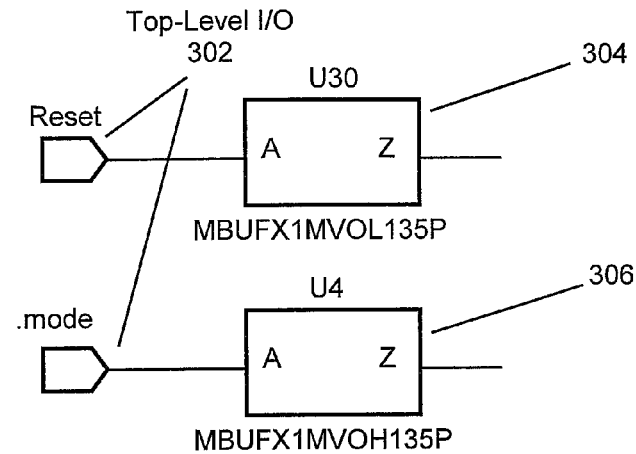
FIG. 3 shows an example of grouping design elements according to the invention.
Figure 3:
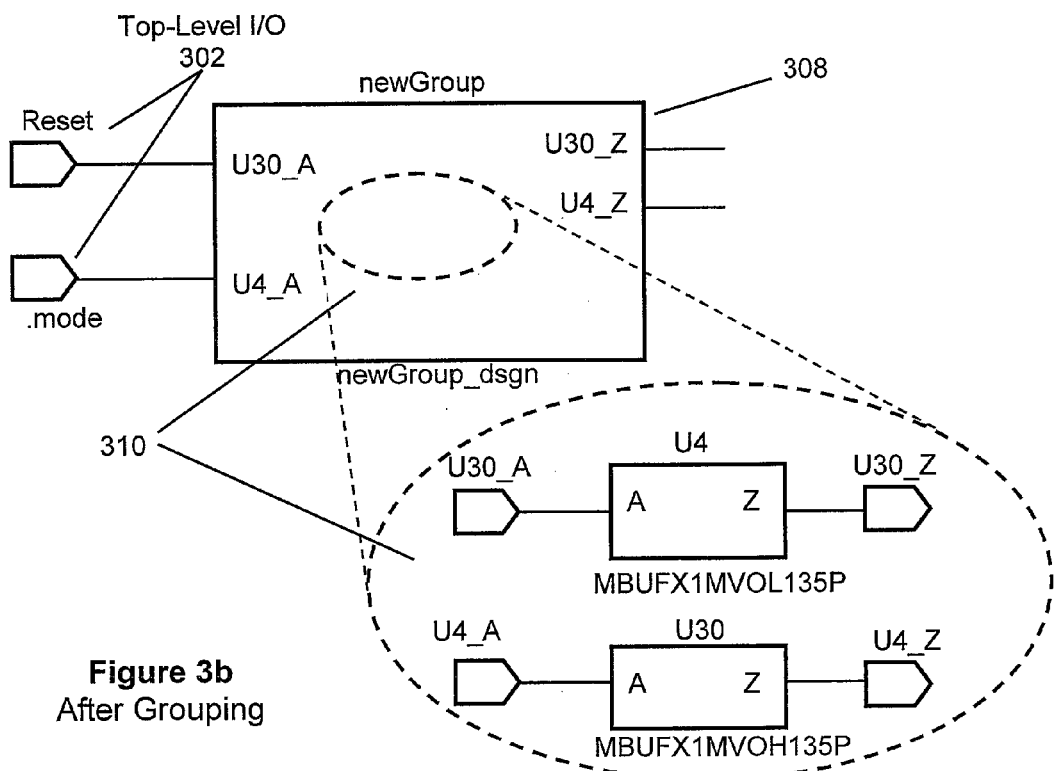

An example 300 of grouping is shown in FIG. 3, where two design element instances U30 304 and U4 306 having top-level I/O connections 302 shown in FIG. 3a are to be grouped into a new IP block called "newGroup" 308 shown in FIG. 3b. Pushing into new IP block instance 308 one finds the two separate design elements U4 and U30 from FIG. 3a, except they are now one level below 308 in the hierarchy and new ports U30_A, U30_Z, U4_A, and U4_Z have been automatically created. The grouping process automatically handles connectivity, port name and size control, and RTL property propagation—all with the underlying principle that the functionality of the resultant RTL functionality after hierarchy re-structuring remains the same as that before re-structuring.

Connectivity Handling:

Software according to the invention iterates over all connections present in any instances being grouped and then determines the destination points for those connections. If any of those connections crosses a boundary of a newly-created hierarchy—a group boundary—resulting from a grouping modification, then that connection is broken into two connections as shown in FIG. 3. One connection exports a grouped instance pin to the group boundary and creates a new port on the group boundary, while the second connection connects this newly created port to the original destination. If however a connection does not cross group boundary then that connection is not altered. For a "tieoff" connection, like a pin on a design element that should be connected to either power or ground, a user has the option to either export it to group boundary or to keep it attached to the original instance. Similarly unconnected ports present in the grouped instances can be exported to the group boundary.

Port Name and Size Control:

Users can control names of ports created in a group boundary based on a naming convention or through a custom Perl function generated or chosen by the user. Perl is a scripting language that is generally familiar to all designers involved in the development of SOC chips. The size of a generated port can also be controlled though different switches that guide the software. Based on those inputs, software according to the invention will calculate the width of a port created on a group boundary either from an in-module port or connection, or alternately from an out-module port or connection.

One exemplary and non-limiting implementation of a user interface for a hierarchy manipulation widget according to the invention includes a pop-up menu that a user can invoke while selecting some portion of the hierarchy in the "Modified Hierarchy" window of the user interface shown in FIG. 2. This dialog box will cause certain actions to affect how the hierarchy is restructured when the Apply button 212 is actuated. In particular, newly created ports and signals can be named to be consistent with drivers (in-module naming) or alternately to be consistent with destinations (out-module naming). In-module naming improves readability in most scenarios since the driver instance of a port is typically unique. However, there could be scenarios where the driver instance is some combinational glue logic (like and/or/xor gates) and the readability will be improved by out-module naming consistent with the pins that are being driven. Also, a user might want to customize the name of newly created ports and nets to align to some internal naming conventions. Hence, a net-name and port-name control is also provided to the user via the user interface widget according to the invention, whereby the user can guide the underlying software for naming operations based on the driver of a port or what the port is driving, as well as various other properties including prefix and suffix characters.

Ports can also be optimized to remove any holes from ports that might get created if a vector connection from grouped instances was not full. For instance, a created port representing a bus might include D0:3 and D6:7, but be missing connections to D4 and D5 which represent "holes" that can be automatically removed from the port definition. A check-box can be included on the widget user interface for this purpose. Likewise and also controlled the widget user interface, unconnected pins on a design element instance can automatically be brought to a group boundary and as such be accessible for being tied-off if necessary.

RTL Property Propagation:

Depending on a user option setting on the user interface widget, software according to the invention can propagate parameters present in grouped instances to group boundaries or can propagate an evaluated value of a parameter. If parameters are propagated to a group boundary, then parameterized ports are also exported as parameterized ports to the group boundary. Verilog localparams and VHDL or system Verilog constants are typically not exported. For VHDL or system Verilog, complex ports of user defined types are typically exported as is, and the corresponding use clause and libraries are attached to the group boundary to ensure legal and correct RTL.

Ungrouping:

Ungrouping involves taking an existing sub-system and dissolving the hierarchy either partially or completely. Different variations of the Ungroup function can hierarchically dissolve all the sub-systems or just until a particular level. In the UI widget, a user can select a portion of the hierarchy and select the Ungroup command. If the hierarchy of a sub-system is completely dissolved, then all design elements inside the sub-system are brought to the same level where the original sub-system was instantiated.

Also with regard to Ungrouping, connectivity may need to be altered so that functionality of the design remains the same. Software according to the invention iterates over each scalar port present in the subsystem being ungrouped and then traverses connections present in the fan-out cones of terminals present outside the subsystem and stores this information for example in set A. Similarly connections attached to corresponding scalar ports inside the sub-system are also traversed and stored for example in set B. Finally "set A" connections are merged with "set B" connections to get a flattened connection ignoring the hierarchy being dissolved. Loopback and feedthrough connections are handled specially, and final destinations of feedthrough connections are connected together after ungrouping because an original feedthrough connection will disappear after ungrouping.

Moving:

Moving involves moving one or more design element instances from their current hierarchy position to any other position in the hierarchy. Moving an instance uproots an existing design element or subsystem of multiple design elements from the present position in the hierarchy and moves these elements to a new hierarchical position in the design hierarchy. During a move instance operation, software according to the invention iterates over all scalar ports presented in the instances being moved and determines flat level connection source or destination points for each pin. The software then deletes connection paths between these points completely, and then creates a new hierarchical connection path from the newly positioned instance in its new hierarchy location to the original source or destination point for each connection. To move one or more design elements, they are typically selected within the hierarchy Manipulation Widget and then may be moved by a choice in a pop-up dialog bow or alternately by cut/copy and paste commends typically executed by conventional Control keys such as <Cntl-X>, <Cntl-C> and <Cntl-V>.

Figure 4:
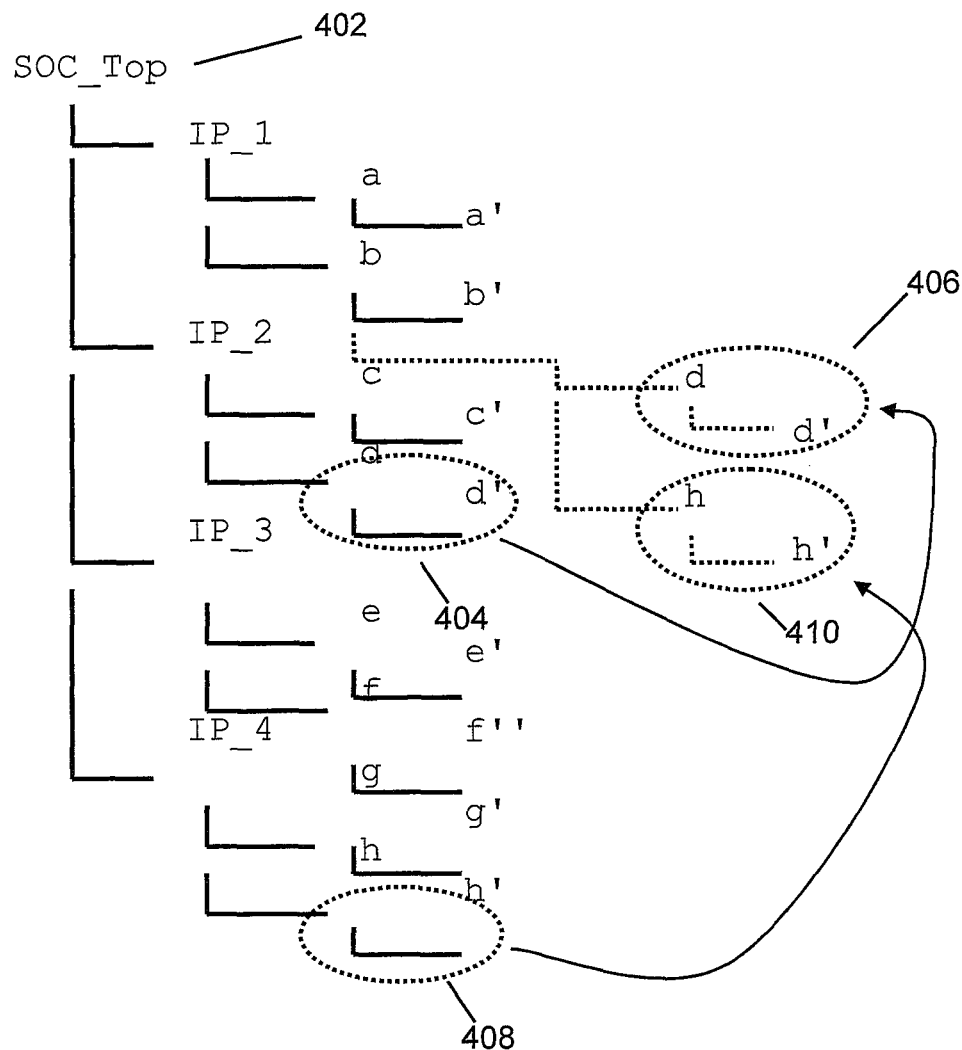
FIG. 4 shows an example of moving and cloning design elements according to the invention.

Cloning vs Moving:

There are times when moving an instance may cause routing congestion or the lengthening of a net such that its performance degrades unacceptably. Example 400 of FIG. 4 shows two design elements, each consisting of two instances, and where these elements are either moved or cloned within the hierarchy named SOC_Top 402. Element 404 comprises elements d and d' in the hierarchy of IP block IP_2, while element 408 comprises elements h and h' in the hierarchy of IP block IP_4. For one example scenario, due to congestion or power distribution considerations it may be advantageous to move both of elements 404 and 408 to positions 406 and 410 respectively in the hierarchy of IP block IP_1.

In that example scenario, simply moving these elements from positions 404 and 408 to positions 406 and 410 respectively may produce an optimum physical design. In a different example scenario, it may be advantageous for instance to keep some connections to element 408 close to the hierarchy of IP_4 while having other connections to element 408 be made closer to the hierarchy of IP_2. This is accomplished by cloning. Here, design element 408 is maintained in its original position as shown in the hierarchy of IP_4, while a duplicate or clone of element 408 is created and placed in the hierarchy of IP_2 in the position shown as 410. The inputs of both 408 and 410 would connect to the same sources, however the outputs would now connect to different destinations such that elements 408 and 410, working in unison, perform the same function that element 408 did originally. The cloning process may be performed by a standard copy/paste process such as that performed on a PC by standard Ctrl-C and Ctrl-V keystrokes, or alternately by commands offered by the Widget user interface.

Connectivity Preservation:

Software according to the invention will move a design element, but at the same time ensures that the connectivity intent is preserved. This is done by complex routing algorithms which look at the connectivity of the design element at three levels:

Connectivity of the design element with other design elements within the same sub-system Connectivity of the design element with ports of the sub-system and how these ports are connected to the rest of the SOC design Connectivity of pins on the design element with floating nets or with constant values Based on the type of connectivity and the final destination of a design element as it is moved within the overall design hierarchy, connectivity traversal finds the optimal method to route these connections across hierarchies and create an optimal number of connections and ports.

SDC Restructuring:

If an existing SoC has SDC (Synopsys Design Constraints), then after RTL hierarchy restructuring a new reconciled SDC is needed. SDC is a documentation format used to specify the design intent, including the timing, power, and area constraints for a design, and guides the synthesis phase of the design process which precedes physical layout. Sanitization of the SDC is needed only for pins, ports and instances when those references are changed because of design element movement within the hierarchy. Here original RTL and SDC constraints are considered as input. During design modification operations, software according to the invention generates a mapping file containing references capturing new hierarchical positions of instances, pins and ports. The software then traverses the SDC data model, queries design objects, and modifies them based on the mapping file.

Figure 5:
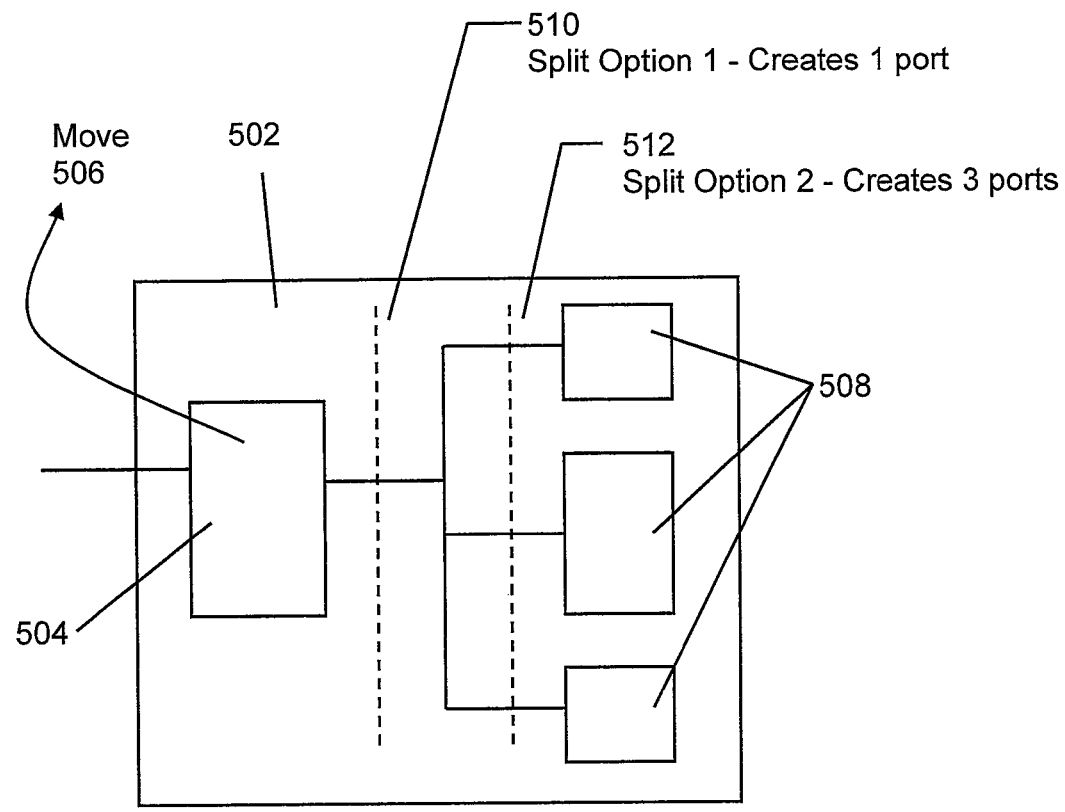
FIG. 5 shows an example for splitting an IP block according to the invention including options for port creation.

Optimizations—Splitting an IP Block:

Hierarchy manipulation according to the invention may include various optimizations based on user guidance. One important optimization relates to the number of ports created after hierarchy manipulation. In example 500 of FIG. 5, design element 504 is being moved 506 from IP block 502 to some other location in the design hierarchy, leaving design elements 508 remaining in IP block 502. This move 506 requires the splitting of connections within IP block 502, however there are two ways to accomplish this. One option is to split IP block 502 at the point shown as 510 and will result in one new port being created. Another option is to split IP block 502 at the point shown as 512 and will result in three new ports being created. In an exemplary embodiment of the UI widget there are two check boxes that can be chosen by a user for this circumstance under an action category labeled of "port generation". One box indicates "minimum" and would correspond to split option 510 in the example of FIG. 5. Another box indicates "maximum" and would correspond to split option 512 in the example of FIG. 5. Both of these scenarios are valid—the first scenario 510 keeps the number of ports to a minimum whereas the second scenario 512 may enable better readability of the generated logic.

Port Width Optimization:

Sometimes scenarios arise when design elements are moved or grouped together, where only certain bits of a vector port are connected to IP blocks outside the hierarchy they are being moved to. In such a scenario, the width of a newly created port could be dependent on the bits which need to be connected to these IP blocks. For example, if a design element connecting to a port with a width of 32 bits is moved to another IP block in the hierarchy, a few bits may remain connected elsewhere in the hierarchy. If for instance two such bits connect elsewhere, software according to the invention may create a port of width 2 instead of a port of width 32. Further, it might be useful to have 2 scalar ports of width 1 each instead of a single port of width 2. This often helps in improving readability of the generated RTL. A user can guide the software to create either scenario.

Deletion of Floating Ports:

Sometimes, ports may be left floating because of the movement of one or more design elements within the hierarchy. An example 600 is shown in FIG. 6 for two IP blocks 604 and 608 are initially connected between ports P1 610 and P2 612 as shown in FIG. 6a. Block 604 contains element IP_1 602 and block 608 contains an element IP_2 606. Subsequently as shown in FIG. 6b, element 602 is moved 614 in the hierarchy from block 604 to block 608 and newly positioned as 616. In this example, after the move, element 602 is still connected to element 606, however it no longer connects to any design elements in block 604. As such, there now exist floating ports at locations 618 and 620 in FIG. 6b. An option on the UI widget per the invention will allow a user to guide software according to the invention delete such floating ports, and in doing so keep the number of ports to an optimal minimum.

Preserving RTL Semantics:

One of the important aspects of restructuring is that the generated RTL after restructuring should look as close as the input RTL as possible with respect to semantics. This is a challenge given the typical amount of changes being done to the input RTL with logic being moved around as the hierarchy is re-structured. To aid in maintaining consistent properties throughout the RTL, software according to the invention traverses the input RTL and creates an internal connectivity model from the input RTL. Much of the RTL information is abstracted and made a part of this connectivity model. Some of the important RTL properties which are preserved in the output RTL after re-structuring are described below.

Net Properties:

Software according to the invention stores each signal name connecting two ports or pins in the input RTL. The same net can also connect multiple ports or pins. Preserving this net is important to maintain the constraints associated with those nets, and also to ensure minimum differences between the original RTL and generated RTL. The software stores these signal names in an internal data structure in system memory and propagates this information in restructuring operations like hierarchy manipulation. During RTL generation, two ports are connected with same signal or net name as present in original RTL. Similarly, if the net is parameterized then the parameters are also preserved and RTL generated after restructuring will be likewise parameterized.

Port Properties:

Similarly, port names, types, and parameters are also preserved for ports except where ports are created or deleted as part of hierarchy re-structuring.

Pragmas and Comments in the RTL:

Comments are a very essential part of any input language as they keep the intent of the designer and are thus important for readability. Pragmas are a special kind of comment in the RTL and are hints to backend tools like physical place and route. Pragmas can be of two types: line pragmas which impact the object on which they are defined; and block pragmas which impact a block of code such as Verilog or VHDL code. Software according to the invention extracts these line and block pragmas and applies them to individual objects in the connectivity model. This is helpful because if the objects are subsequently moved around, some of these properties move around with them. This ensures that even after a lot of restructuring, the comments and pragmas are preserved.

Pragmas are also inferred and stored on relevant objects but not all objects—relevant objects being those which get impacted from hierarchy restructuring. An example of this might be where the RTL includes the concept of "use-clause" for example a method to include a package declaration inside an RTL block. Here, instead of keeping pragmas on the use-clause which don't get impacted by an IP movement, the software determines the objects (IP blocks, connections, etc.) that need information from the included package file, and maintains the information on those objects. Thus when the hierarchy is restructured and an IP block is moved, the use-clause information moves with the IP block. Similarly, if a design element or IP block is within a pragma, then the use-clause which is needed for this IP block will be kept within the same pragma. This abstraction of RTL properties to the connectivity model helps software according to the invention move the information during the hierarchy restructuring process, and produces an output RTL which is as close as possible to the input RTL while still including the desired re-structuring.

RTL User-Defined Types, System Verilog Interfaces, Etc:

Similar to pragmas and comments, the software abstracts these RTL properties to the connectivity model so that these properties move with the associated objects. This ensures that the generated output RTL matches the input RTL closely.

RTL Abstraction:

The software preserves abstractions present in the RTL and keeps them in its internal data structure. During RTL generation after restructuring, abstractions are preserved in the generated RTL. Examples of abstractions would include various Verilog or VHDL formats such as 4'b1101 or 8'hFF. So for instance a parameter p=4'b1101 will be decompiled as is in reconfigured RTL. Similarly, other Verilog and VHDL support logic such as function, task, type defs or simulation code formats are also preserved.

Handling Glue Logic:

An SoC design may often have glue logic like: always blocks; and/or/xor logic; adders; subtractors; etc. Software according to the invention handles glue logic by collecting all the glue logic instances and placing them within a virtual hierarchy. The software will also locate the span information from the input files where these glue logic functions are defined and extract the glue-logic text from the input files. A user can then review the glue logic RTL and edit it if needed through various mechanisms including for example an RTL editor widget. On creating an output netlist, the software will dissolve this virtual glue logic hierarchy so that the output RTL looks same as the input RTL.

The user might optionally want to move the glue logic across hierarchies. In such a scenario, the software creates a true hierarchy of the virtual glue hierarchy and creates a complete module with the glue information. This resultant design element instance can then moved around within the hierarchy as described earlier.

Supporting File Generation:

After hierarchy restructuring, software according to the invention typically generates a supporting file called for example "sources.f", which can be directly feed to downstream tools for subsequent steps of the SoC design process. The software generates RTL for only modified files, and unmodified RTL descriptions are not touched. In the "sources.f" file, the software adds original RTL files for untouched files and newly generated RTL files for modified files in compilation order. It also adds supporting files like for instance package files in VHDL or system Verilog, and includes these files in Verilog in the sources.f file to ensure compatibility. If a user has specified any special RTL option or has supplied any library path information in the original RTL, then that information is also preserved in the generated sources.f file. The sources.f file can therefore be directly passed to any downstream tool.

EDA System and Software

Figure 7:
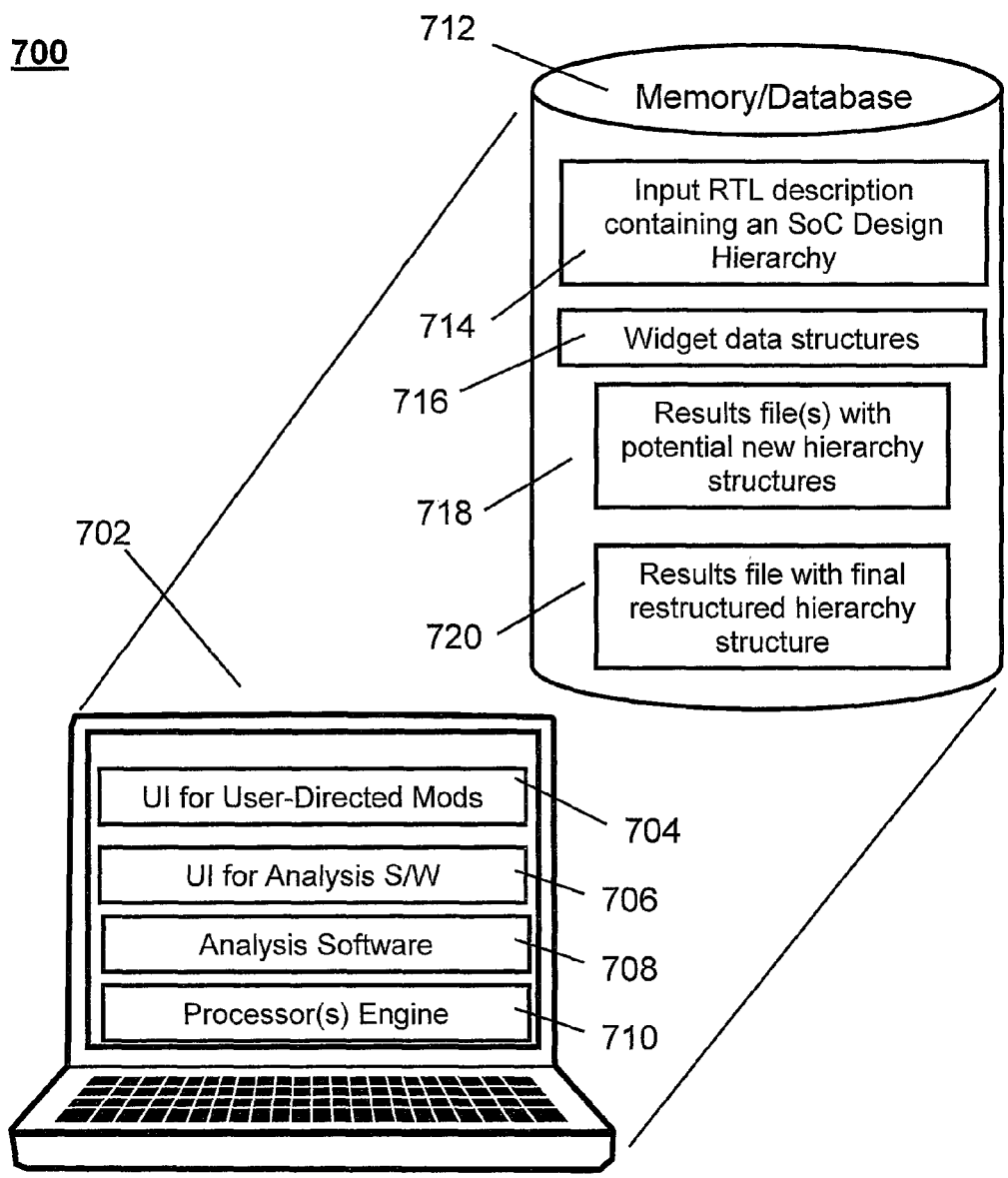
FIG. 7 shows an example of a system for implementing the invention.

In one embodiment of the invention, software according to the invention operates on a system 700 including a computer platform of some kind. Such a platform may include a dedicated workstation, a central computer operated from a remote terminal, or one or more computing resources located on the Internet including resources of the type now known as the "Cloud", and the likes. An exemplary and non-limiting embodiment of a dedicated computer aided design (CAD) or EDA system 700 according to the invention is shown in FIG. 7. Here, a workstation 702 operates a UI 704 for operating the software Hierarchy Manipulation Widget that enables a user to define move, group, and ungroup modifications within a design hierarchy, a UI 706 for controlling any software associated with the invention not directly guided by the widget UI 704. Additional analysis software 708 according to one non-limiting embodiment of the invention is used to operate software functions not directly associated with UI functions 704 and 706. Per the exemplary and non-limiting embodiment of FIG. 7, the invention is implemented by a series of instructions that are executed on one or more processors comprising engine 710 upon which software for workstation 702 operates.

An exemplary memory and database resource 712 for workstation 702 is also shown in FIG. 7. The memory and database resource 712 may be located physically within workstation 702 or alternately be external to workstation 702. Memory and database resource 712 contains for example an input RTL description 714 containing an SoC design hierarchy, data structures 716 including those used by software guided by the Hierarchy Manipulation Widget, one or more output RTL results files 718 containing potential new hierarchy structures (used for "what it" evaluations"), and a final RTL results file 720 containing the final RTL description that the user intends to pass along to the physical design process.

At least certain principles of the invention can be implemented as hardware, firmware, software or any combination thereof. Moreover, the software is preferably implemented as an application program tangibly embodied on a program storage unit, a non-transitory user machine readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

What is claimed is:

1. A computerized method, implemented in a system of one or more processors, instruction memory and a database of RTL-level circuit description netlists, for restructuring a design hierarchy of an RTL-level circuit description netlist, comprising:
receiving by the one or more processors an initial RTL-level circuit description netlist;
creating a hierarchy model for the initial RTL-level circuit description netlist;
receiving from a user by the one or more processors one or more movement, group, or ungroup definitions whereby one or more circuit elements are directed to be moved, grouped, or ungrouped within the hierarchy model;
planning and executing by one or more processors one or more of group, ungroup, and move operations in response to the one or more movement, group, or ungroup definitions, whereby one or more circuit elements are re-positioned in the hierarchy model, and whereby connectivity within a resultant revised circuit description netlist is automatically revised to maintain equivalent functionality to the initial RTL-level circuit description netlist; and
saving into the database by one or more processors the resultant revised RTL-level circuit description netlist;
wherein revision of the RTL-level circuit description netlist is performed prior to a physical placement of design elements during a layout process.

2. The computerized method of claim 1, further comprising minimizing by the one or more processors the number of hierarchy changes required to implement the one or more of group, ungroup, and move operations.

3. The computerized method of claim 1, further comprising creating or revising by the one or more processors one or more ports in the revised RTL-level circuit description netlist as a result of the group, ungroup, and move operations.

4. The computerized method of claim 1, further comprising creating or revising by the one or more processors one or more port names, port widths, or port properties in the revised RTL-level circuit description netlist as a result of the group, ungroup, and move operations.

5. The computerized method of claim 1, further comprising:
receiving by one or more processors additional movement definitions with regard to a first revised hierarchy model;
planning and executing by one or more processors one or more of group, ungroup, and move operations whereby one or more circuit elements are re-positioned in the first revised RTL-level hierarchy model, and whereby connectivity within a resultant second revised RTL-level circuit description netlist is automatically modified to maintain equivalent functionality with the initial RTL-level circuit description netlist; and
saving into the database by one or more processors the second revised RTL-level circuit description netlist.

6. The computerized method of claim 1, further comprising:
  repeating by the one or more processors the method of claim 1 to create and save a plurality of RTL-level circuit description netlists representing alternative hierarchy configurations for the initial RTL-level circuit descriptions netlist; and
  evaluating by the one or more processors each of the plurality of RTL-level circuit description netlists to determine which one produces an optimum level of performance.

7. The computerized method of claim 1, further comprising creating by the one or more processors a virtual hierarchy for portions of the initial RTL-level circuit description netlist that comprise glue logic, prior to the planning and executing by one or more processors one or more of group, ungroup, and move operations.

8. The computerized method of claim 1, further comprising cloning by the one or more processors a first circuit element as part of a move operation, such that the first circuit element remains in its original position in the hierarchy and a second circuit element identical to the first is placed in a different location in the hierarchy.

9. The computerized method of claim 1, further comprising identifying and removing by the one or more processors floating nodes that are created as a result of any of the group, ungroup, and move operations.

10. The computerized method of claim 1, further comprising providing by the one or more processors a hierarchy manipulation user interface displaying both a current hierarchy model and a proposed hierarchy model that would result from the one or more movement definitions.

11. The computerized method of claim 1, wherein an output RTL description corresponding to the revised RTL-level circuit description netlist is made similar to an input RTL description corresponding to the initial RTL-level circuit description netlist by the method further comprising:
  traversing the input RTL description to create an internal connectivity model; and
  creating the output RTL description based in part on the internal connectivity model, whereby the output RTL description is made similar to the input RTL description with respect to at least one of net properties, port properties, pragmas, and comments.

12. A system for re-structuring a design hierarchy of an RTL-level circuit description netlist, the system comprising:
  one or more processors;
  a memory that contains instructions for execution by the one or more processors; and
  a database for storing one or more RTL-level circuit description netlists;
  wherein the one or more processors by execution of instructions stored in the memory perform at least the following steps:
  receiving an initial RTL-level circuit description netlist;
  creating a hierarchy model for the initial RTL-level circuit description netlist;
  receiving from a user one or more movement, group, or ungroup definitions, whereby one or more circuit elements are directed to be moved, grouped, or ungrouped within the hierarchy model;
  planning and execution of one or more of group, ungroup, and move operations in response to the one or more movement, group, or ungroup definitions, whereby one or more circuit elements are re-positioned in the hierarchy model, and whereby connectivity within a resultant revised RTL-level circuit description netlist is automatically revised to maintain equivalent functionality to the initial RTL-level circuit description netlist; and
  saving into the database the resultant revised RTL-level circuit description netlist.

13. The system of claim 12, wherein the one or more processors minimize the number of hierarchy changes required to implement the one or more of group, ungroup, and move operations.

14. The system of claim 12, wherein the one or more processors create or revise one or more ports in the revised RTL-level circuit description netlist as a result of the group, ungroup, and move operations.

15. The system of claim 12, wherein the one or more processors create or revise one or more port names, port widths, or port properties in the revised RTL-level circuit description netlist as a result of the group, ungroup, and move operations.

16. The system of claim 12, wherein:
  the one or more processors receive additional movement definitions with regard to a first revised hierarchy model;
  the one or more processors plan and execute one or more of group, ungroup, and move operations whereby one or more circuit elements are re-positioned in the first revised hierarchy model, and whereby connectivity within a resultant second revised RTL-level circuit description netlist is automatically modified to maintain equivalent functionality with the initial RTL-level circuit description netlist; and
  the one or more processors save into the database the second revised RTL-level circuit description netlist.

17. The system of claim 12, wherein:
  the one or more processors repeat the method of claim 11 to create and save a plurality of RTL-level circuit description netlists representing alternative hierarchy configurations for the initial RTL-level circuit descriptions netlist; and
  the one or more processors evaluate each of the plurality of RTL-level circuit description netlists to determine which one produces an optimum level of performance.

18. The system of claim 12, wherein the one or more processors create a virtual hierarchy for portions of the initial RTL-level circuit description netlist that comprise glue logic, prior to the planning and executing by one or more processors one or more of group, ungroup, and move operations.

19. The system of claim 12, wherein the one or more processors clone a first circuit element as part of a move operation, such that the first circuit element remains in its original position in the hierarchy and a second circuit element identical to the first is placed in a different location in the hierarchy.

20. The system of claim 12, wherein the one or more processors identify and remove floating nodes that are created as a result of any of the group, ungroup, and move operations.

21. The system of claim 12, wherein the one or more processors provide a hierarchy manipulation user interface displaying both a current hierarchy and a proposed hierarchy that would result from the one or more movement definitions.

22. The system of claim 12, wherein the one or more processors create an output RTL description corresponding to the revised RTL-level circuit description netlist that is similar to an input RTL description corresponding to the initial RTL-level circuit description netlist by a method comprising:
  traversing the input RTL description to create an internal connectivity model; and creating the output RTL description based in part on the internal connectivity model, whereby the output RTL description is made similar to the input RTL description with respect to at least one of net properties, port properties, pragmas, and comments.

\* \* \* \* \*